United States Patent Office 2,868,688
Patented Jan. 13, 1959

2,868,688
STABILIZED PESTICIDAL COMPOSITIONS

Hans A. Benesi, Berkeley, Calif., Yun Pei Sun and Erwin S. Loeffler, Denver, Colo., and Kenneth D. Detling, Orinda, Calif., assignors to Shell Development Company, Emeryville, Calif., a corporation of Delaware No Drawing. Application October 21, 1953
Serial No. 387,512

16 Claims. (Cl. 167—42)

This invention relates to new and improved biocidal compositions of matter. More particularly, the present invention pertains to new and improved insecticidal compositions of matter of the type that are prepared or compounded in the dry, dusty, powdery, or pulverulent form, such as dusts and wettable powders. Methods for preparing the new and improved compositions of the invention are included within the purview of the invention.

Within recent years there have been discovered and in certain cases put into commercial manufacure and use, a number of highly effective synthetic organic toxicants for insects and members of allied classes of animals. Among the most effective of these new insect poisons have been found to be certain polycyclic synthetic organic compounds which are chemically characterized, inter alia, by the presence of chlorine (or other halogen) substitution in the molecule. These highly chlorinated synthetic insecticides can be applied to plants, trees, and other flora, as well as to other sites of application, by the various methods already known for application of insecticides. For example, a solution or suspension of the toxicant may be sprayed, or a dust comprising the toxicant adsorbed on or in admixture with a solid carrier may be dusted over the area to which the toxicant is to be applied. The dusts ordinarily are prepared by the formulator, who then sells and ships the composition ready for use. For orchard, field-crop and other large-scale applications by spraying, the toxicant frequently will be put up in the form of a dry powder containing wetting agents, dispersing or suspending agents, and other adjuncts, for shipment in the dry or solid state to the consumer who then mixes the wettable powder with water to form the liquid spray composition.

Although the preparation and shipment of the insecticidal composition in the dry state has the advantage of providing material savings both in formulation and shipment of the compositions, relative to formulation and shipment of liquid compositions, certain heretofore unexplained difficulties have been encountered when the above-mentioned polycyclic halogen-substituted toxicants have been put up in the form of dusts or wettable powders. There have been several instances where the wettable powder, after bagging, has ignited spontaneously, with substantial loss of property including, of course, the destruction of the insecticidal composition. In certain other cases it has been found that the wettable powder during shipment or even relatively brief storage has deteriorated even to the extent of losing substantially all of its insecticidal activity. Since the wettable powder typically may contain as much as 50% or more by weight of the organic halogen-containing toxicant, the balance being the carrier dust, suspending agents, and the like, and since there has been observed no material loss of weight of the insecticidal composition, it has been clear that in these latter cases there has occurred a chemical conversion of the toxicant to a non-toxic material, rather than, say, mere loss of the toxicant by volatilization. The problem appears to be one that is peculiar to the dusts, wettable powders, and similar pulverulent compositions for the reason that in the pure state the same toxicants in most cases will be substantially stable.

In accordance with the present invention there are provided new and improved dusts, powders, wettable powders, and like pulverulent solid biocidal compositions which overcome the difficulties heretofore encountered and indicated herein. The compositions of the invention comprise the toxicant of the class herein defined, a finely divided carrier dust, diluent, extender, or carrier of the types employed prior to our invention as an ingredient of dusts, wettable powders, and like pulverulent compositions, and certain adjuncts which we have found impart a high degree of stability to the formulated compositions. The adjuncts which are incorporated in the pulverulent insecticidal compositions according to the invention are certain bases and basic-acting materials. The bases and basic-acting materials which we employ may be referred to as mobile, or diffusible, bases and basic-acting materials, that is to say, bases and basic-acting materials which upon incorporation with the finely divided carrier, diluent, extender, or filler, diffuse throughout the composition and onto the surfaces of the individual solid particles of the carrier, diluent, extender, or filler. While we do not intend to be bound by any proposed theory, it is believed that the base or basic-acting material serves to inhibit a certain catalytic action of the finely divided carrier upon the toxicant present in the composition, and, further, that this inhibition is brought about by neutralization of certain acidic sites which are on the surface of the individual particles of the carrier and to which such catalytic action is attributable.

The wettable powders, dusts, and like pulverulent insecticidal compositions with which the invention is concerned contain the toxicant intimately mixed with or in some cases adsorbed on a toxicologically substantially inert filler or diluent, such as a talc, clay, diatomaceous earth, calcium silicate, silica, alumina, pyrophyllite, calcite, or mixtures of the same or other finely divided solid material. We have discovered, and this discovery forms one of the elements of our invention, that the above-described problems which have been encountered in the formulation of dusts and wettable powders containing highly chlorinated (halogenated) polycyclic toxicants is traceable in part to the type of diluent or filler that is used with the highly chlorinated toxicant in formulating the insecticidal composition. More particularly, we have discovered that the instability, of a degree sufficient to lead to spontaneous ignition of the composition under appropriate circumstances, is attributable in large part to the particular diluent or filler that is employed, and especially to be related to a property of the solid diluent or filler which conveniently may and will be referred to herein as the intrinsic acidity.

For purposes of explaining and defining the term intrinsic acidity as applied to these solid diluents and fillers, it is necessary to outline briefly certain aspects of the more modern concepts of acid-base relationships insofar as they are pertinent to an understanding of our invention.

When an acid is dissolved in water it will form a solution having an acidity, or pH value, that is determined solely by the concentration and the acidic strength of the particular acid. The acidity of the solution is determined by the extent to which the reaction:

(1) 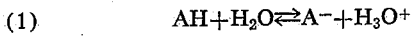

proceeds to the right, that is, by the tendency of the particular acid, AH, to react with the water yielding the conjugate base or anion, A⁻, of the acid and the oxonium ion. For dilute aqueous solutions the acidic strength of the acid can be defined by the ionization constant, $K_A'$, which is the equilibrium constant for Reaction 1:

(2) 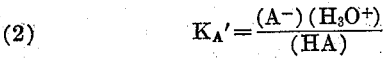

the parentheses indicating concentrations of the respective ionic and molecular species. The acidity constant can be expressed in terms of the $pK_A'$ value of the acid which is related to the acidity constant by the equation:

(3) $$pK_A' = -\log K_A'$$

From these relationships, it will be apparent that, the stronger the acid the higher will be the numerical value of the acidity constant $K_A'$ and, conversely, the lower will be the numerical value of the corresponding $pK_A'$ value.

It will be evident that the reaction of the acid HA with water to form the conjugate base $A^-$ and the oxonium ion can be considered to be the sum of two separate reactions; firstly, the ionization of the acid to yield the anion $A^-$ and the hydrogen ion $H^+$ and, secondly, the hydration of the hydrogen ion.

(4) $$HA \rightleftharpoons A^- + H^+$$

(5) $$H^+ + H_2O \rightleftharpoons H_3O^+$$

It thus will be seen that the extent to which the reaction represented by Equation 1 will extend to the right at equilibrium is determined not only by the tendency of the acid to undergo dissociation according to the reaction represented by Equation 4, but also by the basicity of the water, or its affinity for the proton. The range of acidity constants which can be measured in water is limited by reason of the basicity of the water. Thus, with different acids of progressively increasing acidic strength, there is found a limiting group of acids which, in water, ionize to such an extent according to Equation 1 that the respective concentrations of the undissociated acid HA are too small to detect and the acids are commonly referred to as being completely dissociated. These acids are also referred to as the "strong acids." They are typified by HCl, HBr, $HClO_4$, and in water are indistinguishable from each other in acidic strength. Thus, owing to the basicity of water, and the prevalence of aqueous systems, it has been common to regard the possible range of determinate $pK_A'$ values as being limited to positive numerical values.

It will be seen from further consideration of Equations 1, 4, and 5 that, if there is substituted for the water a material B which is less basic (has less affinity for the proton) than does water, there will be less tendency for the reaction (6) $$AH + B \rightleftharpoons A^- + HB^+$$

to proceed to the right than when water, instead of B, is present as the proton acceptor. It thus is conceivable that, by employing suitable non-aqueous systems, there will be found to exist materials which, although having $pK_A$ values which are indeterminable in aqueous solutions, have $pK_A$ values which can be ascertained when appropriate measurements are carried out in the presence of only such less basic materials. This indeed has been found to be the case, and it has been found that there are a number of materials whose acidity constants are beyond the scale that is determinable in an aqueous system.

For measurement of these hyperacidities, as the acidity constants beyond the scale determinable in aqueous systems may be referred to, we take advantage of the fact that there are a number of electrically neutral bases, less basic than water, which exhibit a color change upon reaction with an acid, that is, upon acquisition of a proton. Thus, upon mixing the neutral base B with an acid AH the base acquires a proton from (is neutralized by) the acid (7) $$B + AH \rightarrow BH^+ + A^-$$

and the transition from B to $BH^+$ results in a visible change of color. The extent to which the base B will combine with the acid HA depends upon the strength of the base as well as upon the strength of the acid. With decreasing basic strength (decreasing affinity for the proton) in a series of different electrically neutral bases, it will require progressively stronger acids to cause one half of the added base to exist in the form of its conjugate acid $HB^+$. Conversely, in a series of acids of progressively increasing acid strength, it will require progressively weaker bases to remain only half neutralized when brought into contact with the acid.

The intrinsic acidity of an acid thus can be defined, for the purposes of our invention, as the numerical value given by the equation:

(8) $$\text{Intrinsic acidity} = pK_A = pK_{BH^+} + \log \frac{(C_B)}{(C_{BH^+})}$$

in which $pK_{BH^+}$ is the acid ionization constant for the conjugate acid $BH^+$ of a neutral base B, referred to dilute aqueous solutions. It will be seen that the intrinsic acidity of an acid is numerically equal to the acid ionization constant for the conjugate acid of a neutral base which, in contact with the acid, is caused to exist one half in the form of the conjugate acid $BH^+$ of the base B.

A limited number of neutral bases (proton acceptors) are known (1) to be sufficiently weak bases to be neutralizable by acids having acidity constants in the region of hyperacidity and (2) to show a visible change of color upon such neutralization. Hammett, L. P., "Physical Organic Chemistry," McGraw-Hill, 1940 (New York), page 266. Illustrative of such indicators which we may use are the compounds that are listed in the following table with the acid dissociation constants ($pK_{BH^+}$) for their respective conjugate acids.

| Indicator | $pK_{BH^+}$ | Neutral Color | Acid Color |
|---|---|---|---|
| p-dimethylaminoazobenzene | +3.3 | yellow | red. |
| 2-amino-5-azotoluene | +2.2 | do | orange. |
| benzeneazodiphenylamine | +1.5 | do | red-purple. |
| dicinnamalacetone | -2.2 | do | red. |
| benzalacetophenone | -5.6 | colorless | yellow. |
| anthraquinone | -8.15 | do | Do. |

It may be noted that benzalacetophenone, with a $pK_{BH^+}$ equal to $-5.6$, does not change color in aqueous sulfuric acid solution until the strength of the solution exceeds 70% $H_2SO_4$, and that a concentration of approximately 90% $H_2SO_4$ is required in order to convert anthraquinone into its colored, conjugate acid.

We have found that the intrinsic acidity of the solid diluents, carriers, extenders, or fillers which are used for formulating dusts, wettable powders, and similar pulverulent insecticidal compositions can be determined by applying to it, either before or after incorporation of the toxicant, a small amount of a solution in an organic solvent of an indicator having a previously determined $pK_{BH^+}$ value and observing the color of the solid containing the adsorbed indicator compound. For example, we have found that, when a small amount of a benzene solution of dicinnamalacetone, is applied to Attaclay, a commercial insecticidal carrier composed of finely ground attapulgite, there is observed a development, from the almost colorless solution, of a deep red color on the clay. This observation reveals two important facts; firstly, that the surface of the clay is reacting with the dicinnamalacetone in the same way that an acid reacts with it and, secondly, that the surface of the clay is acting as an acid having sufficient acidic strength to convert the dicinnamalacetone to its colored, acidic form. By employing a series of indicators with known acid dissociation constants, and by observation of the colors when separate samples of the carrier material are treated with the respective indicator solutions, the intrinsic acidity of the carrier material can be substantially quantitatively ascertained. We have discovered, and this discovery forms a further element of our invention, that various materials heretofore widely used as supposedly inert diluent or carriers in the formulation of insecticidal dusts and carriers have surprisingly high intrinsic acidities, and that the stronger is the intrinsic acidity of the carrier material the more prone is the insecticidal composition containing it and the toxicants with which we are concerned, to undergo loss of toxicity or even vigorous decomposition.

The strength of the intrinsic acidities that are involved can be readily illustrated by specific figures. Representative samples of Attapulgite clay, when dried at 120° C. and then tested in the manner described above, react basic when tested with benzalacetophenone and acid when tested with dicinnamalacetone, evidencing a $pK_A$ value for the Attapulgite clay between about −2 and about −5. When a typical kaolin is tested similarly, it reacts acidic to all of the indicators listed above except anthraquinone, to which it is mildly basic. These observations indicate a $pK_A$ value between −5 and −8 for the kaolin. The strength of the acidities represented by these figures will be better appreciated when it is understood, as we have observed, that addition of a small amount of benzalacetophenone to aqueous sulfuric acid solution yields the yellow color typical of the acidic reaction of this indicator only when the solution has a sulfuric acid concentration of 70% or more. Anthraquinone, which is but partly neutralized by the kaolin, shows an acidic reaction, upon addition to sulfuric acid, only when the sulfuric acid has a concentration of 90% or more $H_2SO_4$.

The intrinsic acidities of the diluents or carriers which are employed in the insecticidal compositions can be conveniently determined by applying a small amount of a solution of the indicator compound in an inert, neutral organic solvent, such as benzene or iso-octane, to the carrier or diluent or to the insecticidal composition containing the carrier or diluent, the material to be tested being either in the dry state or moistened with a further quantity of the solvent. Indicator solutions containing 0.2% by weight of the indicator compound are suitable. When a small amount of dry, finely ground kaolin is spread on a piece of white paper and a drop or two, for example, of p-dimethylaminoazobenzene solution in benzene is dropped onto the clay, the spot moistened by the solution instantly turns a brilliant crimson indicating that the indicator is present in its acid form on the clay. When the indicators listed in the above table are applied to different portions of the kaolin, each of the indicators through benzalacetophenone develops the typical acid color indicating that the kaolin has a $pK_A$ value lower than the $pK_{BH+}$ value of the indicator. Instead of applying the indicator solution to the dry material that is to be tested, a small amount (e. g., 0.1 to 0.2 gram) may be placed in a test tube, a cubic centimeter or so of benzene added, and the indicator solution (one or two drops) added, whereupon the solid acquires the color characteristic of the indicator and the $pK_A$ value of the solid.

The intrinsic acidities which have been discussed above are to be clearly distinguished from the acidities of the carrier materials as measured by the conventional technique of suspending the carrier material in water to form a paste or suspension, and determining the pH value of the paste or suspension. Indeed, there appears to be no observable correlation between the intrinsic acidity of a carrier or diluent and its acidity as determined by the latter method. This will be further seen from the experimentally determined values which are given in the following table:

| Solid Diluent | Intrinsic Acidity ($pK_A$ Value) | pH of Water Suspension |
| --- | --- | --- |
| Kaolin | −5 to −8 | 4.6 |
| Diluex | −5 | 9.5 |
| Attapulgite | −5 | 7.2 |
| Pike's Peak clay | −2 to −5 | 5.1 |
| Diatomaceous earth | +1 to −2 | 5.2 |
| Pyrophyllite | +1 | 6.2 |

The values shown in the preceding table for Diluex emphasize the distinction between the intrinsic acidity and the acidity as determined by measurement of the pH of a suspension of the solid diluent in water. While the aqueous suspension of Diluex showed a pH of 9.2, which represents a mildly alkaline solution, the intrinsic acidity of Diluex was found to correspond to a $pK_A$ value of −5, and an acidic strength approximately equivalent to that of a 70% solution of $H_2SO_4$.

We have now discovered, and this discovery forms a further and important element of our invention, that stable, insecticidally active biocidal compositions comprising the halogen-substituted, polycyclic synthetic organic toxicants with which the invention is concerned and a pulverulent solid diluent, carrier, extender, or filler, with or without other adjuncts, can be obtained by incorporating in the composition mobile bases or basic-acting materials, i. e., bases or basic-acting materials which have sufficient mobility to diffuse throughout, transfuse or permeate the pulverulent composition and thereby to reach and to react or combine with, or neutralize the surfaces of the individual minute solid particles of the finely divided solid carrier, diluent or filler at the temperatures normally encountered during grinding, mixing, or blending, or storage of the biocidal composition. Bases and basic-acting materials which can be employed include materials which, although in themselves not free bases or alkalies, have an alkaline reaction or basicity, and materials which, although in themselves substantially non-basic, decompose under the conditions encountered in the grinding, mixing, blending or subsequent storage to yield in situ a mobile base or basic-acting material.

The materials which we may employ as such bases, basic-acting materials, and progenitors of bases or basic-acting materials may be normally either liquid, solid, or gaseous. However, the materials which are normally solid and have an appreciable volatility offer certain advantages from the standpoint of ease of incorporation in the solid pulverulent biocidal compositions as well as a generally more effective and longer lasting stabilizing action, and hence are to be preferred.

It appears to be essential that the base or basic-acting agent, when incorporated in solid form in the compositions, have an appreciable volatility under the conditions that are encountered in the mixing, blending, or grinding operations, and that the progenitor, if a progenitor in solid form is employed, decompose under such conditions to produce an appreciable vapor of a base or basic-acting material. The vapors thus generated in the blended composition appear to suffuse the individual particles, entering the pores and interstices of the individual particles and neutralizing or combining with the acidic sites which give rise to high intrinsic acidity. It is to be noted in this respect that a dry non-volatile base or basic-reacting material, when blended into or intimately mixed in finely divided state with dry mixtures of the halogenated toxicants with which the invention is concerned and a solid pulverulent diluent having a high intrinsic acidity, does not impart stability to the composition. It appears from our studies that the dry non-volatile base or basic-acting material lacks the requisite mobility, or diffusability, and that by reason of this lack it is incapable of reaching and combining with or neutralizing acidic sites on the exterior and within the interstices or pores of the individual particles of the solid diluent, carrier, or filler, with the result that stability as realized by the practice of the present invention is not attained.

On the other hand, we may employ substantially non-volatile basic-acting materials in the form of solutions. For example, an alkali, such as sodium hydroxide or potassium hydroxide, or an alkaline salt, such as sodium carbonate, may be applied to the solid carrier by forming a slurry of the solid carrier in a solution of the basic-acting material, thereby neutralizing the intrinsic acidity of the surfaces of the carrier, and then washing and drying the treated carrier. Thereafter the toxicant and other components of the desired pulverulent biocidal composition may be suitably incorporated with the treated carrier dust, as by grinding, to yield a stable composition of our invention.

The base, basic-acting material, or progenitor, when applied in liquid form, may comprise a solution in water or an organic solvent of a solute which is normally gaseous, normally liquid, or normally solid, or the base, basic-acting material, or progenitor may be a single substance which itself is liquid at the temperatures involved. Volatile bases and basic-acting materials which can be employed in liquid form include, for example, ammonia, ammonia applied as an aqueous ammonium hydroxide solution, and lower alkylamines such as methylamine and ethylamine. Bases which are normally liquid and may be applied as such or dissolved in a solvent include higher alkylamines such as isopropylamine, propylamine, hexylamine, amylamine, isoamylamine, undecylamine, triethylamine, and homologous and analogous mono-, di-, and trialkylamines. Cyclic amines may also be employed, such as the aromatic amines aniline, N-methylaniline, diphenylamine, beta-phenylethylamine and naphthylamine, as well as heterocyclic amines such as piperidine, 2,2,4,6-tetramethylpiperidine, pyridine, tetrahydropyrimidine, and morpholine, and alicyclic amines, such as dihexylamine, and 3,3,5-trimethylcyclohexylamine. Polyamines may also be used, such as ethylenediamine, diethylenetriamine, triethylenetetramine, and hexamethylenediamine, as well as substituted amines such as ethanolamine, diethanolamine, triethanolamine, 2-hydroxy-1,3-propanediamine, N-(3-amino-2-hydroxypropyl)-3-amine-2-hydroxypropylamine, 3-chloro-2-hydroxypropylamine, and the like and their homologs and analogs.

From the standpoint of ease of preparation, their stability, and durability, the most desirable compositions of the invention are those which comprise the pulverulent inert diluent, filler, or carrier, the toxicant of the class with which the invention is concerned, and in intimate admixture therewith a solid, finely divided, appreciably volatile base or basic-acting material or progenitor of an appreciably volatile base or basic-acting material. The base, basic-acting material, or progenitor advantageously may be any compound which over the range of from about normal temperatures, say, 25° C. to about 150° C., decomposes either by simple thermal decomposition or by acid-catalyzed decomposition to yield ammonia or one of the normally gaseous lower homologs of ammonia, that is to say, a lower volatile alkylamine. The preferred materials of this type which are employed in the compositions of the invention are the amides of carbonic acid and salts of carbonic acid with nitrogen bases, including without being limited to ammonium carbonate, ammonium bicarbonate, ammonium carbamate, urea, methylurea, ethylurea, methyleneurea, acetylurea, sodium allophonate, ethyl allophonate, thiourea, and isothiourea. Guanadine may also be employed, as may salts of guanadine, such as guanadine carbonate. Further solid progenitors which we may employ include hexamethylenetetramine, melamine, cyanamide, and substituted ureas, such as methylurea, triethylurea, ethylideneurea, and trimethyleneurea.

We have found it to be particularly desirable that the base, basic-acting material, or progenitor be one which has a melting point above and not too near the normal or ambient temperatures, yet which has sufficient volatility or tendency to decompose to yield ammonia at temperatures within the range normally encountered during grinding, blending, mixing, packaging, and storing the biocidal compositions. Of particular value have been found to be urea, ammonium carbamate, ammonium carbonate, and ammonium bicarbonate. They may be used individually or mixtures of any two, three or of all four may be employed.

The toxicants which are employed in the improved compositions of the invention are the organic halogen-containing (chlorine-containing) biocidal compounds which contain a plurality of atoms of halogen (chlorine) and a plurality of rings at least two of which are fused together and at least one of which rings that are fused together is substituted by halogen (chlorine). When reference is made to rings that are fused together, or to a fused ring system, reference is intended to the structure in which at least two rings of atoms are directly attached to each other with two or more carbon atoms being common to each of the rings of a fused pair of rings. For example, indene 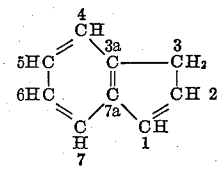 contains two rings—one the $C_5$ ring and the other the $C_6$ ring—and the carbon atoms numbered 7a and 3a are common to both rings. Biphenyl, 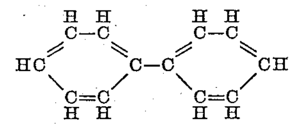 although it contains two rings does not contain two carbon atoms common to the two rings and, therefore, does not contain a fused ring system. Similarly, spiro[4.5]-decane, 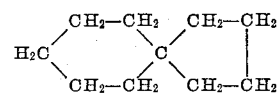 has but one carbon atom common to the two rings and, therefore, does not contain a fused ring system. In the fused ring system of the toxicants which we employ, the respective rings may be of the same size, i. e., both may be hexatomic, heptatomic, pentatomic, tetratomic, etc., or one ring may be of one size and a ring fused therewith may be of a different ring size. Thus, the biocides with which the invention is concerned may be described generically as containing the structure in which R and R′ are divalent radicals which, together with the carbons form a fused ring system and $x$ represents 0 or a small whole positive number, and in which at least one of the two rings depicted by the formula is halogen (chlorine) polysubstituted. The divalent radicals represented by R and R′ may be linear unsubstituted acyclic hydrocarbon groups, such as the methylene, ethylene, propylene radicals and their alkyl and/or chlorine-substituted analogs, e. g., 2-methylpropylene, 1,2,3-trichloropropylene, or 2-bromopropylene, or they may be unsaturated, as for example, the 1,2-dichloroethenylene radical (—CCl=CCl—), the ethenylene radical (—CH=CH—)

the 2-butenylene-1,4 radical ($—CH_2—CH=CH—CH_2—$)

the 2,3-dichloro-2-butenylene-1,4 radical ($—CH_2—CCl=CCl—CH_2—$)

the hexachloro-2-butenylene-1,4 radical ($—CCl_2—CCl=CCl—CCl_2—$)

the 1-chloro-2-propenylene-1,3 radical (—CHCl—CH=CH—)

and the 2-chloro-2-propenylene-1,3 radical ($—CH_2—CCl=CH—$)

The groups represented by R and R' may be the same or they may be different, and one or both may comprise in itself a ring structure; for example, one or both of the groups represented by R and R' may be a 4-cyclohexenylene-1,2 radical

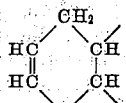

a 3,6-methano-4-cyclohexenylene-1,2 radical

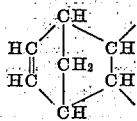

a 3-cyclopentenylene-1,2 radical

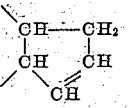

a cyclopentylene-1,2 radical

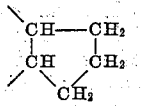

or a halogen-substituted cyclopentylene or cyclopentenylene radical, such as

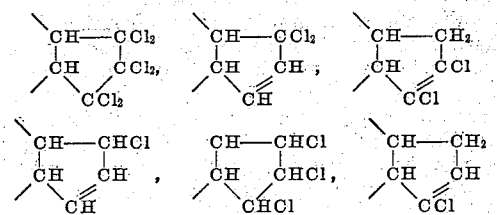

One or both of the groups represented by R and R' may be substituted, as by an epoxy or episulfido group, or by an oxy (—OH), oxo (=O), or ester group, such as the acetoxy, carbethoxy, or chloroacetoxy group, or by a ketonic or acyl group, such as the acetyl group. Illustrative substituted groups which are represented by R and R' are as follows:

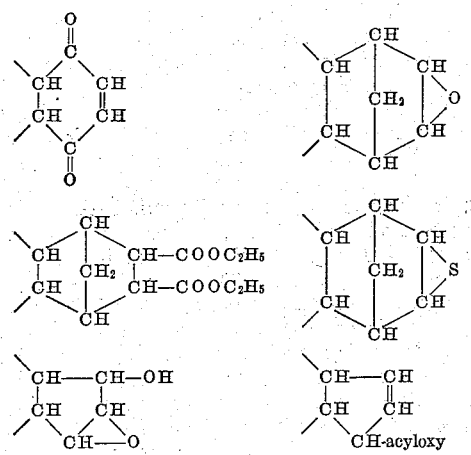

The principles of our invention are primarily applicable to those halogen-substituted organic insecticides which are described by the generic structural formula

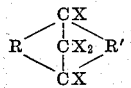

in which R and R' each represent a divalent radical as defined above and each X represents an atom of halogen. Each X can be bromine or chlorine; in the best known toxicants of the group defined by this formula each X is chlorine and R represents the dichloroethenylene radical (—CCl=CCl—). R' generally is a pentatomic carbocyclic ring which in itself may be either unsubstituted, or substituted by halogen (chlorine), or a member of a group of fused pentatomic rings, as in the formula

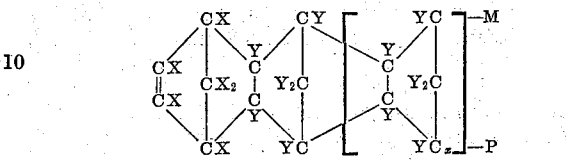

when $x$ has a positive integral value. In this latter formula for the general case $x$ represents 0 or a small whole positive number, and M and P represent separately hydrogen, halogen (chlorine), or hydroxyl, and together the ethenylene group, the ethylene group, or an epi-substituted ethenylene group wherein the epiatomic component may be selected from the class consisting of epoxy, episulfido, and episulfoxy.

Toxicants to which the principles of the invention are primarily applicable for preparing new and improved pulverulent insecticidal compositions include, for example, aldrin, which is the 1,2,3,4,10,10-hexachloro-1,4,4a, 5,8,8a-hexahydro - 1,4,5,8 - dimethanonaphthalene having the stereochemical configuration of the product of Diels-Alder reaction of hexachlorocyclopentadiene and bicyclo-(2.2.1)-2,5-heptadiene and which can be prepared by such reaction, and the stereoisomer of aldrin, namely, isodrin, which is the 1,2,3,4,10,10-hexachloro-1,4,4a,5,8, 8a - hexahydro-1,4,5,8-dimethanonaphthalene having the stereochemical configuration of the product of Diels-Alder reaction of cyclopentadiene and 1,2,3,4,7,7-hexachlorobicyclo(2.2.1)heptadiene-2,5 and which can be prepared by such reaction.

Other toxicants to which the principles of the invention are similarly applicable are Endrin, the 1,2,3,4,10,10-hexachloro-1,4,4a,5,8,8a-hexahydro - 6,7 - epoxy - 1,4,5,8-dimethanonaphthalene which is the epoxide of isodrin; dieldrin, the 1,2,3,4,10,10-hexachloro-1,4,4a,5,8,8a-hexahydro-6,7-epoxy-1,4,5,8 - dimethanonaphthalene which is the epoxide of aldrin; 1,4,5,8,9,10-trimethano-1,2,3,4,13, 13-hexachloro-1,4,4a,5,6,7,8a,9,9a,10,10a-dodecahydroanthracene, 1,2,3,4,6,6,10,10 - octachloro - 1,4,4a,5,6,7,8,8a-octahydro-1,4,5,8-dimethanonaphthalene, 1,2,3,4,6,10,10-heptachloro - 1,4,4a,5,6,7,8,8a - octahydro-1,4,5,8-dimethanonaphthalene, 6-phenyl-1,2,3,4,10,10-hexachloro-1,4,4a, 5,6,7,8,8a-octahydro-1,4,5,8-dimethanonaphthalene, 6 - acetoxy-1,2,3,4,10,10-hexachloro - 1,4,4a,5,6,7,8,8a - octahydro-1,4,5,8-dimethanonaphthalene, 6-keto-1,2,3,4,6,10,10-hexachloro-1,4,4a,5,6,7,8,8a-octahydro-1,4,5,8-dimethanonaphthalene, 6,6,7-trimethyl-1,2,3,4,6,10,10-hexachloro-1, 4,4a,5,6,7,8,8a - octahydro-1,4,5,8-dimethanonaphthalene, 6-ethyl-7-methyl-1,2,3,4,6,10,10-hexachloro-1,4,4a,5,6,7,8, 8a-octahydro-1,4,5,8-dimethanonaphthalene; the dodecachlorohexacycloheptadecadiene ($C_{17}H_8Cl_{12}$) which is produced as the infusible solid Diels-Alder adduct of bicyclo-(2.2.1)-2,5-heptadiene with 2 moles of hexachlorocyclopentadiene; the dicarbethoxyhexachlorotetracyclododecadiene ($C_{18}H_{14}O_4Cl_6$) which is obtained as Diels-Alder adduct of 2,3-dicarbethoxy-2,5-heptadiene (the Diels-Alder adduct of diethyl maleate and cyclopentadiene) and hexachlorocyclopentadiene; the dioxohexachlorotricyclononadecadiene which is obtained by Diels-Alder reaction between hexachlorocyclopentadiene as the diene and 1,4-benzoquinone as the dienophile; the hydroquinone isomer of said dioxohexachlorotricyclononadecadiene; chlordane, or Octachlor, which is 1,2,4,5,6,7,8,8-octachloro-2,3,3a,4,7,7a-hexahydro - 4,7 - methanoindene; including, specifically, the various stereochemical isomers which are comprehended by the planar structure named heptachlor, or 1 (or 3a), 4,5,6,7,8,8-heptachloro-3a,4,7, 7a-tetrahydro-4,7-methanoindene; "compound 601," or 1, 2,3,4,7,7-hexachlorobicyclo-(2.2.1)heptadiene - 2,5; hexabromotetracyclododecadiene formed as Diels-Alder adduct of hexabromocyclopentadiene and cyclopentadiene; the stereoisomeric episulfides of isodrin and aldrin, respectively, each having the planar structure represented by the name 1,2,3,4,10,10-hexachloro-1,4,4a,5,6,7,8,8a-octahydro-6,7-episulfido-1,4,5,8-dimethanonaphthalene; chlordene, or 4,5,6,7,8,8-hexachloro-3a,4,7,7a-tetrahydro-4,7-methanoindene; 1-hydroxy-4,5,6,7,8,8-hexachloro - 3a,4,7, 7a-tetrahydro-4,7-methanoindene, or 1-hydroxychlordene; HCA bromides, such as 1(or 2-)-bromo-4,5,6,7,8,8-hexachloro-3a,4,7,7a-tetrahydro-4,7-methanoindene; and HCA epoxides, such as 1,2-epoxy-4,5,6,7,8,8-hexachloro-3a,4,7, 7a-tetrahydro-4,7-methanoindene.

Further examples of toxicants with which the principles of our invention are applicable are the chlorinated polycyclic terpenes containing fused alicyclic rings. The carbon atom or atoms which are common to the two rings may be substituted by methyl groups or chloromethyl groups, as in chlorinated alpha-pinane, chlorinated camphane, or chlorinated alpha-pinene, or the bridge carbons may be unsubstituted by other than hydrogen or chlorine, as in the probable structure of chlorinated camphene. The chlorinated terpene may be one prepared by chlorination of a relatively pure compound, for example, toxaphene, or chlorinated camphene, or it may be a chlorinated mixture of terpenes, as, for example, strobane.

The principles of our invention are applicable to the formulation of new and improved biocidal compositions of matter with the aid of any of the customary diluents, carriers, extenders, or fillers which are useful for the formulation of pulverulent dry insecticidal dusts, wettable powders and the like. Of primary importance, of course, are the compositions of the invention in which the carrier, diluent, extender, or filler is one which normally is characterized by high intrinsic acidity. In this case the problem of instability of the formulated composition is directly overcome and new, useful, stable compositions are obtained, which are highly toxic at the outset and retain their toxicity under conditions highly detrimental to the compositions known prior to our invention. However, it will be readily understood by those skilled in the art that the application of the principles of our invention is not correspondingly limited. For example, a dust or powder containing a toxicant of the class defined herein and a nonacidic pulverulent mineral carrier or diluent may be prepared with incorporation of urea, ammonium bicarbonate, or ammonium carbamate. By reason of the presence of the nitrogenous component, the composition tends to be protected against decomposition should the composition be subsequently inadvertently or intentionally blended or diluted with an intrinsically acidic diluent, such as attapulgite or kaolin.

The carriers, diluents, or extenders with which instability of the halogen-containing fused-ring polycyclic toxicants is encountered are primarily those which have an intrinsic acidity stronger than is represented by a $pK_A$ value of about 0 determined as described herein. The problem of instability of the formulated insecticidal composition has been found to be particularly acute when the carrier, dried at 120° C., is one having an intrinsic acidity greater than a $pK_A$ value of about —2. We have found that many clays, in particular, are characterized by objectionably high intrinsic acidity, and of the clays those of the kaolinite group, specifically kaolinite, nacrite, dickite, and anauxite, and those of the attapulgite group, such as attapulgite and sepiolite, warrant particular mention. Less strongly acidic carriers or diluents which can be employed for preparing the new and improved compositions of the invention include, among others, the montmorillonite clays, such as montmorillonite, saponite, montronite, and beidellite, and other silicates, such as talc, mica, and pyrophyllite, sulfates, such as gypsum, and carbonates, such as calcite and dolomite. The carriers or diluents can be employed singly or mixtures may be employed. Other diluents may be included, such as walnut shell and other botanical flours, diatomites, elemental sulfur, and the like.

The amount of the mobile, or perfusable base, basic-acting material, or progenitor which is incorporated in the biocidal compositions of our invention may be varied, within limits, according to the intrinsic acidity of the pulverulent carrier or diluent, as well as according to the amount of the carrier present in the composition. The amount should be sufficient to at least substantially neutralize the intrinsic acidity of the carrier or diluent. Whether the intrinsic acidity has been neutralized can be determined conveniently by measuring the apparent $pK_A$ value of the complete biocidal composition (or of a mixture of the carrier or diluent and the base, basic-acting material or progenitor) with the aid of p-dimethylaminoazobenzene or equivalent indicator. Compositions prepared according to our invention which register an apparent $pK_A$ value not stronger than about $pK_A$ +3, or wherein a mixture of the carrier or diluent prior to incorporation of the toxicant registers a $pK_A$ value not stronger than about $pK_A$ +1, generally can be expected to be completely stable in blending, grinding, storage, packaging, and shipment, while even compositions which have been brought only to an apparent $pK_A$ value of 0 will show a marked improvement in stability over the corresponding compositions known only prior to the invention. When the composition is one comprising endrin as toxicant, it is preferable that the carrier dust be neutralized to a $pK_A$ value of from 4 to 5. When we refer to neutralization, we mean neutralization to a measured $pK_A$ value not less than $pK_A$ 0, as distinguished from the perhaps more usual reference to neutralization of an aqueous solution as meaning to a hydrogen ion concentration represented by pH 7. The minimum amount of the base, basic-acting material or progenitor required for neutralizing the intrinsic acidity, while depending upon, inter alia, the equivalent weight of the base, basic-acting material, or progenitor, generally will be between about 0.05% and about 10% by weight of the pulverulent carrier or diluent. Amounts over about 10% by weight of the pulverulent carrier or diluent ordinarily are unnecessary, although as much as 25% or more, same basis, of the base, basic-acting material, or progenitor may be employed if desired.

The compositions of our invention can be prepared by the customary methods of the art for preparing pulverulent solid biocidal compositions. If the mobile, or perfusable, base, basic-acting material, or progenitor is to be applied in liquid form, the liquid is sprayed onto the filler, extender, diluent, or carrier while grinding, mixing, or blending. When a gaseous base, such as gaseous ammonia, is to be applied, we incorporate it preferably by grinding, mixing, or blending the solid carrier in closed equipment in an atmosphere containing the gaseous agent. The normally solid bases, basic-acting materials, and progenitors are most easily incorporated singly by grinding, dry-mixing, or blending them into the insecticidal composition. The base, basic-acting material, or progenitor can be incorporated prior to, concurrently with, or after the incorporation of the toxicant and/or other adjuncts. When a progenitor, such as urea, is incorporated, which decomposes only slowly at normal temperatures, we may preliminarily mix it with the pulverulent carrier or diluent and allow an aging period, say a few hours or more, prior to incorporation of the toxicant. In this way, adequate permeation of the individual particles of the carrier or diluent is ensured and any possibility of localized inadequate neutralization is obviated.

The dusts and wettable powders of our invention can be prepared with the aid of adjuvants of types well-known to those skilled in the art such as wetting agents, sticking agents, dispersing agents, or deflocculants, and the like. As sticking agents we may use casein, gelatine, cellulose derivatives such as carboxy-methyl cellulose, sulfite waste liquor, a gum, a water-dispersible synthetic resin, mineral oil, or equivalent adhesives all of which are well-known in the art. Wetting agents and dispersing agents which may be employed include the various naturally occurring or synthetic surface-acting materials known for the purpose, such as, inter alia, soaps, saponins, lecithins, fatty acid salts, long-chain alcohols, sulfonated aliphatic and/or aromatic hydrocarbon derivatives, hydroxy esters, such as sorbitan monolaurate, pine oil, and the like.

In the biocidal compositions of our invention the polyhalogeno-substituted fused-ring polycyclic toxicant may be present as the sole toxic agent. Useful compositions can also be prepared according to the invention containing a plurality of such toxic agents. In conjunction therewith there may be employed other insecticidal agents of natural or synthetic, of mineral or organic origin, among which come into consideration sulfur, copper arsenate, pyrethrum, allethrin, DMC, HETP, malathon, DDT, BHC, lindane, and others well-known to those skilled in the art. For dusts, which are to be applied to the habitats of the insect in dry form, the composition ordinarily will contain from about 1 to about 20% by weight of the toxicant, while for wettable powders, which are applied as a spray after dispersing in water, the content of toxicant in the pulverulent composition can be as high as 50%, 60% or even 75% by weight of the composition.

The following examples are presented for the purpose of illustrating certain of the specific modes of applying the principles of our invention. It will be appreciated that there are other specific embodiments of the invention than those that are shown in the examples and, therefore, that the invention should not be misconstrued as being limited to the particular embodiments of the examples.

*Example 1*

This example illustrates a wettable powder prepared according to the invention from dieldrin and Attaclay. Attaclay is a commercially available diluent for insecticidal powders, produced by Attapulgus Clay Company. It is a finely powdered grade of attapulgite clay, or Attapulgus fuller's earth, characterized by a bulk density of from about 27 to 31 pounds per cubic foot and an average particle size of about 1 to 2 microns.

Two different lots of dieldrin dust concentrates were prepared. The first lot (A) was prepared by blending together Attaclay and 5% of urea, based on the weight of Attaclay. When the urea and Attaclay had been thoroughly mixed technical dieldrin (1,2,3,4,10,10-hexachloro - 1,4,4a,5,8,8a - hexahydro - 6,7 - epoxy-1,4,5,8-dimethanonaphthalene; 97% purity) was added to give a mixture having a 25% by weight content of dieldrin. The well-blended mixture then was ground successively in a hammer mill and an air mill until, when tested by the wet sieve method, 99.5% passed through U. S. No. 325 sieve. The second lot (B) was prepared in an identical manner except that the urea was omitted. Fifty-pound bags of each of the two lots of dust concentrate then were stored at 150° F., which approximates temperatures attainable in railway box cars during the summer. Samples of the compositions were withdrawn after one week and two weeks' storage, and the content of dieldrin was determined. The following results were observed:

|  | Lot A | Lot B |
| --- | --- | --- |
| Percent Decomposition of Dieldrin: |  |  |
| After 1 week at 150° F | 0 | >98 |
| After 2 weeks at 150° F | .0 | (a) |
| Intrinsic Acidity ($pK_A$): |  |  |
| After 1 week at 150° F | +1.5 | −2 |
| After 2 weeks at 150° F | +1.5 | (a) | a Not determined.

Attaclay, dried at 120° C., when tested by the indicator method described herein, exhibits an intrinsic acidity represented by a $pK_A$ value of about $pK_A$ −5. As noted previously herein, an aqueous suspension of Attaclay exhibits a pH value of about 7.2 or, in other words, is essentially neutral. Lot A, after the two weeks' storage at 150° F., was found to have retained its initial toxicity to insects, to be readily suspendible in water, and to be non-phytotoxic. Lot B, at the end of the storage period, was substantially non-toxic to insects.

*Example 2*

This example illustrates a composition of our invention containing ammonium bicarbonate. The composition was prepared in the same manner as lot A in Example 1 except that an equal weight of ammonium bicarbonate was substituted for the urea. When tested in the manner described in Example 1, the composition containing ammonium bicarbonate showed no decomposition of the dieldrin during the two weeks' storage at 150° F., and was toxicologically active, phytotoxically inert, and readily suspendible in water.

The composition containing ammonium bicarbonate exhibited an intrinsic acidity represented by a $pK_A$ value of $pK_A$ +1.5.

While both urea and ammonium bicarbonate thus show excellent stabilizing action, urea has the particular advantage that aqueous suspensions of the compositions containing it have a lower pH value than corresponding compositions containing ammonium bicarbonate. This difference is one that deserves consideration when it is desired to employ wetting agents, deflocculants, or the like, which would be adversely affected by excessive alkalinity. The pH of an aqueous suspension of a composition such as lot A, Example 1, ordinarily will be between about pH 4 and about pH 8.

*Example 3*

While thoroughly blending, 5% by weight of a 20% by weight aqueous solution of ammonia was sprayed onto Attaclay. After the mixture was thoroughly blended, dieldrin was added to yield a mixture containing 25% by weight dieldrin. The mixture was thoroughly blended and ground to pass a U. S. No. 325 sieve. A 50-pound bag of the dust concentrate was stored two weeks at 150° F., during which time there was no observable decomposition of the dieldrin. The dust concentrate, at the end of the storage time, had retained its initial toxicity, was nonphytotoxic, and was readily suspendible in water.

The intrinsic acidity of the dust concentrate of this example corresponded to a $pK_A$ value of about $pK_A$ +1.5.

*Example 4*

Illustrative compositions of our invention particularly adapted for suspending in water to yield a spray are shown in the following table:

| Ingredient | Percent by Weight | | | |
| --- | --- | --- | --- | --- |
|  | 4-A | 4-B | 4-C | 4-D |
| Dieldrin, technical (97% purity) | 52.7 | 51.6 | 51.6 | 51.6 |
| Duponol ME, dry a | 1.0 | 1.0 | 1.0 | 1.0 |
| Marasperse CB b | 5.1 | 5.0 | 5.0 | 5.0 |
| Sodium tripolyphosphate | 1.0 | 1.0 | 1.0 | 1.0 |
| Attaclay | 40.2 | 39.4 | 39.4 | 39.4 |
| Urea |  | 2.0 |  |  |
| $NH_4HCO_3$ |  |  | 2.0 |  |
| 20% aq. $NH_4OH$ solution |  |  |  | 2.0 |
| Total | 100.0 | 100.0 | 100.0 | 100.0 | a Dispersing agent; sodium salt of technical lauryl alcohol sulfate; E. I. du Pont de Nemours and Company.
b Dispersant; partially desulfonated sodium lignosulfonate; Marathon Corporation.

Suspendability of the compositions was tested by suspending aliquots in water to give a nominal dieldrin concentration of 0.625% by weight. The actual dieldrin concentrations of the suspensions were determined analytically and found to be as follows:

| Wettable Powder | 4-A | 4-B | 4-C | 4-D |
|---|---|---|---|---|
| Suspendability, percent | 95 | 92 | 94 | 92 |

The results show that, within the limits of accuracy of the method, the urea, ammonium bicarbonate, and ammonia were without material effect on the suspendability.

The stability of the compositions was determined by heating separate 25-gram aliquots in vented test tubes at 90° C. and periodically determining the dieldrin content of the aliquots. The following results were obtained:

| Composition No. | Percentage Decomposition of the Dieldrin Time of Heating at 90° C, Hours | | | |
|---|---|---|---|---|
| | 0 | 24 | 48 | 108 |
| 4-A | 0 | 50 | >98 | |
| 4-B | 0 | 0 | 0 | 0 |
| 4-C | 0 | 0 | 0 | 0 |
| 4-D | 0 | 0 | 0 | 0 |

*Example 5*

In this and the following examples there was employed a differential thermal analytical method for ascertaining the stabilities of representative compositions of the invention. The method is based upon the observed fact that chemical decomposition of the toxicant, when it occurs, is accompanied by evolution or absorption of heat, depending upon whether the chemical reaction is exothermic or endothermic. The occurrence of chemical reaction while a sample of the composition is slowly heated thus is detected by sensitive measurement of heat evolved or absorbed during the heating of the sample.

The apparatus that was used comprised a cylindrical metal block about 3 inches in diameter and 2 inches high. Three holes, each about ⅜ inch diameter and ½ inch deep, were drilled into the central area of the upper face of the block. In one hole was positioned a thermocouple. This hole was packed with a sample of the carrier or diluent from the sample of the insecticidal dust or powder that was to be tested. The thermocouple was connected to controlling means whereby the temperature of the block was measured and the rate of heating of the block by suitably positioned electric heaters was controlled to a desired value. The second of the three holes was packed with a further quantity of the carrier or filler, and the third hole was packed with a quantity of the insecticidal dust or powder that was to be tested. Thermocouples in each of these latter two holes were connected together in opposition and then to a recording potentiometer. The potentiometer measured any differences between the temperatures of the powders or dusts contained in the second and third holes. While the block was slowly heated, the temperatures of the samples in the second and third holes would increase progressively and equally so long as no chemical or physical change in the insecticidal dust or powder occurred. If a chemical change or decomposition of the insecticidal dust or powder should occur, the change would be accompanied by either liberation or absorption of heat, depending upon whether the reaction was endothermic or exothermic, and with the liberation or absorption of heat a measurable temperature difference between the samples in the second and third holes would be established. By means of the recording potentiometer the temperature at which such a temperature difference first became evident was accurately recorded, and the magnitude of the temperature difference was measured.

In this example, a dust concentrate composed of 25% by weight dieldrin and 75% by weight kaolin was tested. With kaolin alone in one of the two holes containing the interconnected thermocouples and the dust concentrate in the other of these two holes, and with the metal block heated at a constant rate of 2½ degrees C. per minute, the pen of the recording potentiometer drew a perfectly straight line on the recording chart (recording temperature difference vs. time, or vs. actual temperature of the block) until a block temperature of 90–96° C. was reached. With further heating there developed a marked positive temperature difference between the two samples which reached its peak at a block temperature of 98–112° C., indicating that an exothermal reaction was occurring in the sample containing the dieldrin. Heating was continued to a maximum temperature of about 150° C. The block was then cooled, the sample withdrawn, and the content of dieldrin in the heated sample was determined by extraction with an organic solvent and measurement of the dieldrin content of the extract by means of infrared absorption. The sample was found to contain 0% dieldrin.

A second sample of the dust concentrate then was tested. This second sample was the same as the first, except that 1% by weight of ammonium bicarbonate was thoroughly blended with the kaolin prior to the admixture of the kaolin and dieldrin. When tested similarly by differential thermal analysis there was observed no evidence of the exothermal reaction which was noted with the first sample. Analysis of the dieldrin content of the heated sample containing ammonium bicarbonate, by the method used for the first sample, showed its dieldrin content still to be 25% by weight.

*Example 6*

In this example there were compared by the differential thermal method samples of 25:75 (weight basis) dieldrin-Attapulgus clay dust concentrates containing, respectively, no additive, ammonium bicarbonate as additive, and urea as additive. The results shown in the following table were observed:

| Additive | Amount of Additive,[a] percent | Temperature (° C.) at Which Exothermic Reaction Was Recorded | |
|---|---|---|---|
| | | Start of Reaction | Maximum Exothermicity |
| none | | 93 | 109. |
| ammonium bicarbonate | 1 | no reaction recorded up to 160° C. | no reaction recorded up to 160° C. |
| urea | 1 | some reaction recorded, initiating at about 150° C. | 160° C. |
| Do | 2 | no reaction recorded up to 160° C. | no reaction recorded up to 160° C. |
| Do | 3 | do | Do. |
| Do | 4 | do | Do. |
| Do | 5 | do | Do. |

[a] Percent by weight based on the Attapulgus clay.

*Example 7*

Further samples of 25:75 (weight basis) dieldrin-kaolin dust concentrates were prepared and tested according to the method described in Example 5. The following results were obtained:

| Additive | Amount of Additive,[a] percent | Temperature (° C.) at Which Exothermic Reaction Was Recorded | |
|---|---|---|---|
| | | Start of Reaction | Maximum Exothermicity |
| none | | 90–96 | 98–112. |
| ammonium bicarbonate | 1 | no reaction recorded up to 160° C. | no reaction recorded up to 160° C. |
| NH₄OH (aq.)[b] | 0.4 | do | Do. |
| urea | 1 | do | Do. |

[a] Based on the weight of the clay.
[b] Blended by adding 2% by weight of 20% aqueous ammonium hydroxide to the clay, and after thorough mixing working in the dieldrin.

Example 8

Using the method described in Example 5, 25:75 (weight basis) dust concentrates containing endrin as the toxicant were prepared and tested for stability. The results shown in the following table were observed:

| Carrier | Additive | Amount of Additive,[a] percent | Temperature (°C.) at Which Exothermic Reaction Was Recorded | |
|---|---|---|---|---|
| | | | Start of Reaction | Maximum Exothermicity |
| kaolin | none | | 31 | 72 |
| Do | ammonium bicarbonate | 1 | 102 | 124 |
| Attapulgus clay | none | | ca. 104 | ca. 116 |
| Do | urea | 2 | ca. 118 | ca. 142 |

[a] Based on the weight of the carrier.

Example 9

Using the method described in Example 5, 25:75 (weight basis) Isodrin-kaolin dust concentrates were prepared and tested for stability. The following results were obtained:

| Additive | Amount of Additive,[a] percent | Temperature (° C.) at Which Exothermic Reaction Was Recorded | |
|---|---|---|---|
| | | Start of Reaction | Maximum Exothermicity |
| none | | 91 | 121. |
| ammonium bicarbonate | 1 | no reaction recorded up to 180° C. | no reaction recorded up to 180° C. |

[a] Based on the weight of the kaolin.

Example 10

A series of dieldrin-kaolin dust concentrates containing 25% by weight dieldrin were prepared. One, which served as a control, contained no additive. The others contained ethanolamine, pyridine, and hexamethylenetetramine, respectively, as stabilizers. The results shown in the following table were observed:

| Additive | Amount of Additive, percent | Temperature (° C.) at Which Exothermic Reaction Was Recorded | |
|---|---|---|---|
| | | Start of Reaction | Maximum Exothermicity |
| none | | 91 | 103. |
| ethanolamine | 1 | no reaction recorded up to 180° C. | no reaction recorded up to 180° C. |
| pyridine | 1 | do | Do. |
| hexamethylenetetramine | 1 | do | Do. |

Example 11

A series of dust concentrates containing different toxicants of the chemical type to which the invention pertains was prepared. With each toxicant there was prepared one lot of dust concentrate containing 25% by weight of the toxicant and 75% by weight of the carrier (clay), and a second lot of an otherwise similar dust concentrate containing 1% of urea, based on the weight of the clay, as stabilizer. The dusts were each tested by the thermal differential analysis described in Example 5, with the results shown in the following table:

| Toxicant | Carrier | Amount of Urea percent | Temperature (° C.) at Which Exothermic Reaction Was Recorded | |
|---|---|---|---|---|
| | | | Start of Reaction | Maximum Exothermicity |
| Toxaphene [a] | kaolin | none | 100 | 130 |
| Do [a] | do | 1 | 140 | 160 |
| Chlordane | do | none | 90 | 120 |
| Do | do | 1 | 140 | 170 |
| Heptachlor | Attapulgus clay | none | 110 | 135 |
| Do | do | 2 | 140 | 170 |

[a] Chlorinated camphene having a chlorine content of about 67–69%.

It will be seen that in each case the stability of the dust was materially increased by incorporation of a small amount of urea in the composition.

The new and improved compositions of our invention are initially highly toxic to insects and related non-vertebrates and they retain their toxicity under conditions which prior to our invention were detrimental to the then available insecticidal dusts, wettable powders, and the like containing the toxicants with which we are concerned. The new compositions are non-phytotoxic and are non-injurious to plant life. It will be appreciated by those skilled in the art that there are various specific embodiments of the invention which may be practiced without exceeding the letter and spirit of the appended claims, and that it is our intent to claim the invention broadly, as the prior art may permit.

We claim as our invention:

1. A stable solid, pulverulent biocidal composition comprising as toxicant a polyhalogen-substituted organic compound comprising at least one pair of fused carbocyclic rings having from 3 to 7 ring carbon atoms in each of the rings of said pair and a plurality of atoms of halogen substituted on at least one of said carbocyclic rings, as adjuvant a substantially toxicologically inert pulverulent, solid diluent, said diluent normally having an intrinsic acidity represented by a $pK_A$ less than 0, and an acid-neutralizing agent transfused throughout the composition in an amount at least sufficient to neutralize the intrinsic acidity of said diluent to a value not less than 0 and up to 25% by weight of the said diluent.

2. A composition defined by claim 1 comprising, as a diluent, clay.

3. A composition defined by claim 2 comprising, as an acid-neutralizing agent, urea.

4. A composition defined by claim 2 comprising, as an acid-neutralizing agent, ammonium bicarbonate.

5. A composition defined by claim 2 comprising, as an acid-neutralizing agent, hexamethylenetetramine.

6. A composition defined by claim 2 comprising, as an acid-neutralizing agent, ethanolamine.

7. A stable solid, pulverulent biocidal composition comprising as toxicant a polyhalogen-substituted organic compound comprising at least one pair of fused carbocyclic rings having from 3 to 7 ring carbon atoms in each of the rings of said pair and a plurality of atoms of halogen substituted on at least one of said carbocyclic rings and, as adjuvant, a substantially toxicologically inert, pulverulent, solid diluent normally having an intrinsic acidity represented by a $pK_A$ value less than 0, said diluent having been neutralized to an intrinsic acidity represented by $pK_A$ value not less than 0 with up to 25% by weight of a neutralizing agent.

8. A composition defined by claim 7 containing as toxicant a compound having a structure represented by the planar structural formula

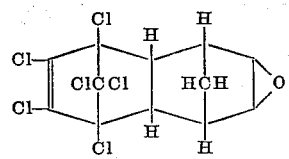

9. A composition defined by claim 7 containing heptachlor as toxicant.

10. A stable solid pulverulent biocidal composition comprising as toxicant a compound having a structure represented by the planar structural formula

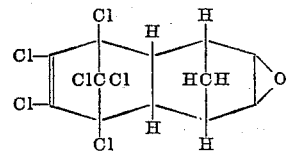

and, as adjuvant, pulverulent clay normally having an intrinsic acidity represented by a $pK_A$ value less than 0, said clay having been neutralized to an intrinsic acidity represented by a $pK_A$ value not less than 0 with from 0.05% to 25% of urea, based on the weight of said clay.

11. A stable solid pulverulent biocidal composition comprising as toxicant a compound having a structure represented by the planar structural formula

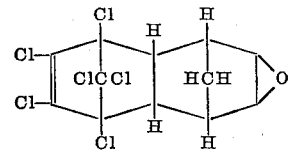

and, as adjuvant, pulverulent clay normally having an intrinsic acidity represented by a $pK_A$ value less than 0, said clay having been neutralized to an intrinsic acidity represented by a $pK_A$ value not less than 0 with from 0.05% to 25% of ammonium bicarbonate based on the weight of said clay.

12. A stable solid, pulverulent biocidal composition comprising as toxicant a compound having a structure represented by the planar structural formula

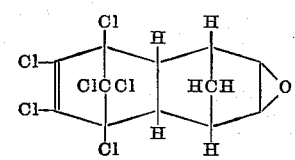

and, as adjuvant, clay normally having an intrinsic acidity represented by a $pK_A$ value less than 0, said clay having been neutralized to an intrinsic acidity represented by a $pK_A$ not less than 0 with from 0.05% to 25% hexamethylene tetramine based on the weight of said clay.

13. An insecticidal adjuvant comprising pulverulent clay normally having an intrinsic acidity represented by a $pK_A$ value less than 0 and in intimate admixture therewith of hexamethylenetetramine in solid state in an amount at least sufficient to neutralize the intrinsic acidity of said clay to a $pK_A$ value not less than 0 and up to 25% by weight of said clay.

14. A stable insecticide composition comprising dieldrin, a finely divided diluent comprising an attapulgite clay normally having an intrinsic acidity represented by a $pK_A$ value less than 0, said clay having been neutralized to an intrinsic acidity represented by a $pK_A$ not less than 0, with from about 0.05% to 25% urea based upon the weight of said clay.

15. A stable insecticide composition comprising dieldrin, a finely divided solid diluent comprising clay normally having an intrinsic acidity represented by a $pK_A$ value less than 0, said clay having been neutralized to an intrinsic acidity represented by a $pK_A$ not less than 0, with from about 0.05% to 25% hexamethylenetetraamine based upon the weight of said clay.

16. A stable insecticide comprising endrin, a finely divided solid diluent comprising clay normally having an intrinsic acidity represented by a $pK_A$ value less than 0, said clay having been neutralized to an intrinsic acidity represented by a $pK_A$ value not less than 0, with from 0.05% to about 25% hexamethylenetetraamine based upon the weight of said clay.

References Cited in the file of this patent

UNITED STATES PATENTS

| | | |
|---|---|---|
| 2,004,788 | Green | June 11, 1935 |
| 2,538,513 | Kenaga | Jan. 16, 1951 |
| 2,579,297 | Buntin | Dec. 18, 1951 |
| 2,671,043 | Gilbert | Mar. 2, 1954 |

FOREIGN PATENTS

| | | |
|---|---|---|
| 624,176 | Great Britain | May 30, 1949 |

OTHER REFERENCES

Knisseff: Chem. Abstr., vol. 26 (1932), p. 3163.

Bussart: Soap and Sanitary Chem., August 1948, p. 127.

Roark: "A Digest of Infor. on Chlordane," U. S. Dept. of Agr., Bur. of Ent. and Plant Quarantine, Agr. Res. Adm., publ. E-817 (April 1951) p. 11.

Roark: "A Digest of Infor. on Toxaphene," U. S. Dept. of Agr., Agr. Res. Adm., Bur. of Ent. and Plant Quarantine, publ. E-802 (1950), p. 6.